Jan. 15, 1924.
G. R. HOFFMAN
TRANSMISSION BAND
Filed March 9, 1923
1,481,096
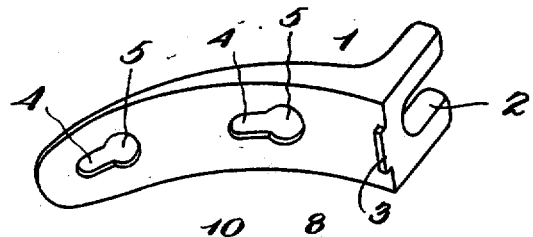
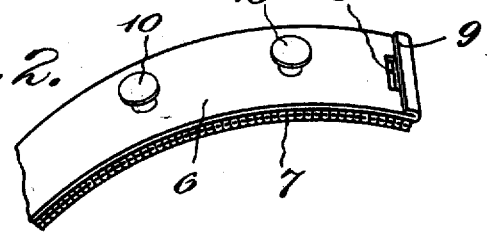
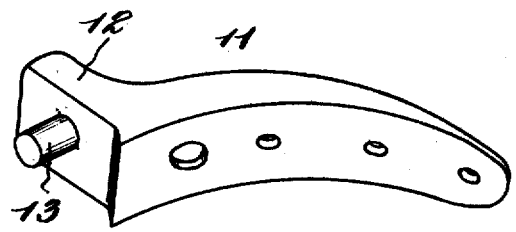
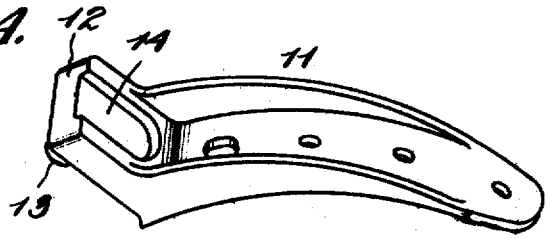
INVENTOR
GLENN R. HOFFMAN Patented Jan. 15, 1924.

1,481,096

UNITED STATES PATENT OFFICE.

GLENN R. HOFFMAN, OF SPRINGFIELD, ILLINOIS, ASSIGNOR TO HOFFMAN MANUFACTURING COMPANY, OF SPRINGFIELD, ILLINOIS, A CORPORATION OF ILLINOIS.

TRANSMISSION BAND.

Application filed March 9, 1923. Serial No. 624,011.

*To all whom it may concern:*

Be it known that I, GLENN R. HOFFMAN, a citizen of the United States, residing at Springfield, in the county of Sangamon and State of Illinois, have invented certain new and useful Improvements in Transmission Bands; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to ears for transmission bands of automobiles or motor vehicles, although the bands may be employed otherwise than for the drums of such vehicles. It has for its object to provide a simple construction that will permit the ready attachment and detachment of the ear in the removal as well as the installation or replacement of the band in relation to its drum, and when applied will afford the maximum strength and secure retention of the ear to the band. It has also for its object an improved construction of the stationary ear of the band, particularly of the slow-speed transmission band, whereby the extension of the slow-speed pedal shaft from one ear to the other as heretofore, particularly in the Ford type of transmission, is obviated by forming the permanent ear with a fixed or integrally formed stud or stem which will receive and support the adjacent end of the transmission band spring, and making provision, for instance by a socket in the upextending end of the ear, to receive the end of the adjusting screw, or a head attached thereto, fitting in the socket to keep the band to its adjustment and against slipping laterally on the drum, the adjustment of said screw serving to tighten the band to its normal non-dragging position on its drum.

To the accomplishment of the foregoing and such other objects as may hereinafter appear, the invention consists in the features hereinafter particularly described and then sought to be clearly defined by the claims, reference being had to the accompanying drawing forming a part hereof, and in which, Figure 1 is a perspective view of the removable ear;

Figure 2 a perspective of a portion of the band to which the ear will be attached;

Figure 3 is a perspective of the permanent ear;

Figure 4 a perspective of the same ear, looking at the top.

In the drawing the numeral 1 designates the removable ear formed as usual with the notched end 2 to receive the pedal shaft and in the present instance formed with a depending lug 3 at its notched end designed to fit in a slot or socket in the metal strap of the transmission band, and in its shank portion with slots 4 having enlargements 5 designed to receive headed studs attached to the metal strap of the band for detachably attaching the ear to the band. The transmission band which comprises the metal strap or band 6 and a lining 7, as usual, is formed in the present instance with a socket or slot 8 designed to receive the lug 3 of the ear, and the end of the metal strap is bent upward and folded down with its edge parallel with the slot 8 and extending beyond its ends so as to form an abutment or shoulder 9 against which the face of the slotted end of the ear will bear along a line or plane above and projected beyond the ends of the lug 3 when the ear is adjusted to its locking position and the lug caused to fit in the slot 8 of the transmission band. The end of the band where the slot is formed is thus reinforced and at the same time an abutment is formed for the end of the ear, all of which results in a strong and efficient connection between the ear and the transmission band. To detach the ear from the band, the shouldered portion of the band is depressed with a suitable tool until the lug 3 and slot 8 are disengaged and then the ear is slipped to bring the heads of the studs 10 attached to the metal strap of the band into register with the enlargements of the slots 4 in the shank of the ear and then the ear can be lifted from the band.

The permanent ear of the band which as usual is attached by rivets to the other end of the band is indicated by the numeral 11. Usually this permanent ear is formed with a notched end the same as the other ear to receive the pedal shaft. Under the present invention the upwardly extended end 12 of the ear is formed with a projecting stem 13, preferably made integral therewith, which will receive and support the adjacent end of the transmission band spring (not shown) instead of supporting that end of the spring by the pedal shaft or a part of it as heretofore. This makes it possible to have a practically solid upturned end to the ear so that it is much stronger than otherwise would be the case, and it also simplifies and facilitates disconnecting the spring and the removal as well as the placement of the band to its position. In the rear face of the upturned end of the ear I form a socket 14, preferably of U shape outline to receive the end of the adjusting screw usually employed in the Ford type of slow speed transmission band, or equivalent construction, which will bear against the ear in the socket portion so that by turning the adjusting screw the transmission band may be tightened sufficiently to prevent drag on the transmission drum and in proper adjustment for prompt application of the band through the foot pedal shaft in the usual way. The adjusting screw and its locking or jam nut and its threaded bearing in the wall of the transmission housing may be as is usual in the Ford type of transmission and therefore not illustrated and described in detail and will bear against the solid upturned end of the ear. A portion of the low speed shaft which extends from the foot pedal will be cut-off so as to shorten that shaft to leave a space between it and the end of the stem 13 to permit the insertion or removal of a spring which will be supported by the stem 13 and adjacent portion of the slow speed shaft. The side walls of the socket formed in the solid upturned end of the ear against which the end of the adjusting screw, or an enlargement on the end thereof, will bear serve to prevent lateral slipping of the transmission band on its drum.

I have illustrated and described the preferred details of construction of the several parts but changes can be made therein without departing from the essential features constituting the invention.

Having described my invention and set forth its merits, what I claim is:

1. A transmission band formed at one end with a slot adjacent to the end and having a portion of a metal part of the band bent upwardly and folded to constitute an abutment extending parallel with the slot and beyond the ends thereof, and a removable ear formed with a depending lug at one end to fit in the slot of the band, the end of the ear bearing against the end abutment of the band along the side of the slot and beyond the ends thereof.

2. An ear for a transmission band formed with a stem projecting from one face to receive a spring.

3. An ear for a transmission band having an upwardly extending end formed with a socket in one face to receive the end of an adjusting screw.

4. An ear for a transmission band having an upwardly extending end formed with a stem projecting from one face to receive a spring and having a socket formed in the other face to receive the end of an adjusting screw.

In testimony whereof I affix my signature in presence of two witnesses.

GLENN R. HOFFMAN.

Witnesses:
 ROY B. McKOWN,
 DAVID H. PAULDING.